(12) United States Patent
Saville

(10) Patent No.: US 7,731,213 B2
(45) Date of Patent: Jun. 8, 2010

(54) BICYCLE ATTACHMENT

(76) Inventor: Neil Saville, 16 Stapylton Street, Coolangatta, Queensland (AU) 4225

( * ) Notice: Subject to any disclaimer, the term of this patent is extended or adjusted under 35 U.S.C. 154(b) by 471 days.

(21) Appl. No.: 11/802,638

(22) Filed: May 24, 2007

(65) Prior Publication Data
US 2007/0278763 A1 Dec. 6, 2007

(30) Foreign Application Priority Data
May 24, 2006 (AU) .............................. 2006902786

(51) Int. Cl.
*B62K 19/30* (2006.01)
(52) U.S. Cl. ................. 280/269; 280/268; 280/267; 280/282; 280/276
(58) Field of Classification Search ............ 280/269, 280/268, 267, 282, 276; 180/210
See application file for complete search history.

(56) References Cited
U.S. PATENT DOCUMENTS

| 3,836,177 A | 9/1974 | Heidt |
| 3,958,814 A * | 5/1976 | Smith .......................... 280/269 |
| 4,469,344 A | 9/1984 | Coil |
| 4,506,753 A * | 3/1985 | Wood, Jr. .................... 180/210 |
| 5,236,060 A * | 8/1993 | Huber ......................... 180/210 |
| 6,953,203 B2 * | 10/2005 | Wilcox et al. ............... 280/282 |
| 2006/0273544 A1 * | 12/2006 | Donovan ..................... 280/282 |

FOREIGN PATENT DOCUMENTS

| DE | 19546770 A1 | 6/1997 |
| JP | 2004237761 A | 8/2004 |
| WO | WO 96/03307 | 8/1996 |

* cited by examiner

*Primary Examiner*—Lesley Morris
*Assistant Examiner*—Marlon A Arce
(74) *Attorney, Agent, or Firm*—Hoffman, Wasson & Gitler

(57) ABSTRACT

A bicycle attachment comprises a pair of spaced rotatable wheels for engaging with a support surface, a connecting portion extending between and secured to the wheels, and a securing portion hinged relative to the connecting portion such that the securing portion is able to pivot relative to the connecting portion. The securing portion is adapted to be secured relative to a fork of a bicycle such that swiveling the fork relative to a frame of the bicycle also swivels the wheels and the connecting portion relative to the frame, and such that pivoting the securing portion relative to the connecting portion also pivots the fork relative to the connecting portion.

11 Claims, 5 Drawing Sheets

BICYCLE ATTACHMENT

FIELD OF THE INVENTION

The present invention relates generally to bicycles and, in particular, to a bicycle attachment.

Although the bicycle attachment according to the present invention will be described with particular reference to being attached to a BMX bicycle, it will be appreciated that this is by way of example only and that the attachment is not necessarily limited to only being attached to a BMX bicycle. For example, the attachment may be secured to a utility, mountain, racing, messenger, touring, or cruiser bicycle.

DESCRIPTION OF RELATED ART

The bicycle is a simple and inexpensive form of transportation which is also used for leisure. Various sizes and types of bicycles are available. Over the years, various modifications and attachments have been developed for bicycles.

Examples of various modified bicycles and bicycle attachments are disclosed in: U.S. Patent Application Publication No. 2006/0273544 A1; U.S. Pat. Nos. 4,469,344; 3,836,177; German Patent Document No. DE 195 46 770 A1; International Patent Publication No. WO 96/03307; and Japanese Patent Document No. 2004237761 A.

It would be desirable to provide a new type of bicycle attachment.

SUMMARY OF THE INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying drawings, wherein, by way of illustration and example, a preferred embodiment of the present invention is disclosed.

According to a broad aspect of the present invention there is provided a bicycle attachment comprising a pair of spaced rotatable wheels for engaging with a support surface, a connecting portion extending between and secured to the wheels, and a securing portion hinged relative to the connecting portion such that the securing portion is able to pivot relative to the connecting portion, wherein the securing portion is adapted to be secured relative to a fork of a bicycle such that swiveling the fork relative to a frame of the bicycle also swivels the wheels and the connecting portion relative to the frame, and such that pivoting the securing portion relative to the connecting portion also pivots the fork relative to the connecting portion.

It has been found that a bicycle which has the attachment installed can be ridden in the normal manner due to the wheels of the attachment being able to rotate with the forks, and due to the forks being able to pivot relative to the connecting portion of the attachment. The attachment is intended to be installed on a bicycle which is ridden in the normal manner in a series of controlled turns on flat to gently sloping terrain. When the bicycle is ridden in this manner it has been found that the sensation of riding the bicycle is unlike that which would normally be experienced when riding a conventional bicycle which does not include the attachment. In particular, it has been found that the steering dynamics of the bicycle which includes the attachment provide the rider with a sensation which is similar to that which can be experienced when surfing or skateboarding, for example. This is not surprising because the steering dynamics of the attachment are not dissimilar to that of a skateboard. A desirable property of the invention is that it allows the sensation of motion and movement of surfing and skateboarding to be achieved on dry land while retaining the normal propulsion and braking advantages of a bicycle.

The design of the attachment allows it to be quickly and easily installed on a new or old bicycle. This can serve to encourage the conversion of disused bicycles by their owners into modified bicycles which will encourage their riders to use the bicycles regularly due to the "fun" factor involved in riding the modified bicycle. The modified bicycle can also be returned to its original state by simply removing the attachment and reinstalling the conventional front wheel of the bicycle and, if necessary, reinstalling the front brake caliper of the bicycle.

The bicycle attachment may be attached to any suitable type of bicycle. For example, the attachment may be attached to a BMX, utility, mountain, racing, messenger, touring, or cruiser bicycle. The inventor has found though that the attachment is particularly suitable for use with BMX bicycles.

The wheels of the bicycle attachment may be any suitable size. Preferably, the wheels are approximately the same width as the wheels of the bicycle to which the bicycle attachment is to be attached. The wheels of the attachment may have any desired diameter, however it is preferred that the wheel diameter is not so large that the wheels interfere with the operation of the attachment. For example, it is preferred that the diameter of the wheels is such that they do not obstruct the securing portion of the attachment and the fork of the bicycle from pivoting relative to the connecting portion of the attachment. If the bicycle is to be ridden on uneven terrain, it is preferred that the wheels of the attachment have a large diameter so as to increase the clearance between the connecting portion of the attachment and the ground on which the bicycle is to be ridden.

The wheels may be spaced apart by any suitable distance. Preferably the wheels are spaced apart from each other by 200 mm to 100 mm. In a particular preferred form, the wheels are spaced apart from each other by 500 mm to 600 mm.

The wheels of the bicycle attachment may be of any suitable type. For example, the wheels may be spoked wheels which comprise a central hub, a rim, and a plurality of spokes extending between the hub and the rim. Alternatively, the wheels may be solid wheels.

The wheels may be fabricated from any suitable material or combination of materials. For example, the wheels may be fabricated from metal, composite material, plastic, or a combination of one or more of the aforementioned materials. Suitable metals may include steel or aluminium, for example. Examples of composite materials from which the wheels may be fabricated include graphite, Kevlar and carbon fibre.

It is preferred that tyres are mounted on the wheels of the attachment. It is particularly preferred that the tyres are pneumatic tyres as these typically provide better ride quality compared to solid tyres. The tyres may be off-road tyres, road tyres, or hybrid tyres which are suitable for both on-road and off-road use.

The connecting portion may be any suitable type of connecting portion. Preferably, the connecting portion is an axle. The axle may have a reduced-width section. The reduced-width section is preferably located midway along the length of the axle.

The connecting portion may be secured to the wheels in any suitable manner. For example, the connecting portion may be received by the wheels so that the wheels are able to rotate relative to the connecting portion. Alternatively, the wheels may be secured to the connecting portion such that they are unable to rotate relative to the connecting portion. For example, if the connecting portion is a rotatable axle, the wheels may be secured relative to the axle such that they are unable to rotate relative to the axle.

The securing portion of the attachment may be hinged relative to the connecting portion in any suitable manner. Preferably, the connecting portion is secured to a bearing, and the securing portion is secured to the bearing by a pivot such that the securing portion is able to pivot relative to the bearing. The pivot is preferably located below the connecting portion. The pivot may be a pivot pin or a bolt, or any other suitable type of pivot. The bearing may be fabricated from any suitable material, however it is preferred that the bearing is fabricated from bronze.

Preferably, the securing portion includes a plurality of plates hinged to the connecting portion, and a tube secured to the plates. In another preferred form, the securing portion includes a tube which is hinged directly to the connecting portion.

The securing portion is preferably adapted to be secured to dropouts of the bicycle fork. Preferably, the securing portion includes a rod which is adapted to be secured to the dropouts. The rod may be part of a bracket. It is preferred that the rod has threaded end portions so that it may be secured to the dropouts with nuts.

It is preferred that the securing portion is adapted to be secured to a pair of arms of the bicycle fork. The securing portion may be adapted to be secured to a portion of the fork where the arms are joined together. In one particular preferred form, the securing portion may be secured to the arms with a nut and a bolt. The bolt is preferably able to extend through an opening in the fork which may be used to secure a brake caliper to the fork.

In another particular preferred form, the securing portion of the bicycle attachment includes a clamp for clamping the attachment to the bicycle fork. The clamp preferably includes a pair of clamping plates for clamping on to the fork. The clamping plates are preferably secured to each other by at least one nut and at least one bolt. At least one bolt which secures the clamping plates to each other may extend through an opening in the bicycle fork which may be used to secure a brake caliper to the fork.

The attachment may also include a resistance mechanism for providing resistance to rotation of the fork relative to the frame of the bicycle. It has been found that the inclusion of such a mechanism can improve the riding stability of the bicycle when the attachment according to the present invention is attached to the bicycle. The resistance mechanism preferably includes a clamp which is adapted to be secured to the frame of the bicycle, and a coil spring extending between the clamp and the securing portion of the attachment.

BRIEF DESCRIPTION OF THE DRAWINGS

In order that the invention may be more fully understood and put into practice, a preferred embodiment thereof will now be described with reference to the accompanying drawings, in which:

FIG. 2 is a side view of the attachment depicted in FIG. 1 as well as the front portion of the bicycle which it is secured to;

FIG. 5 is a side view of the attachment depicted in FIG. 4 as well as the front portion of the bicycle which it is secured to.

DETAILED DESCRIPTION OF THE INVENTION

Figure 1:
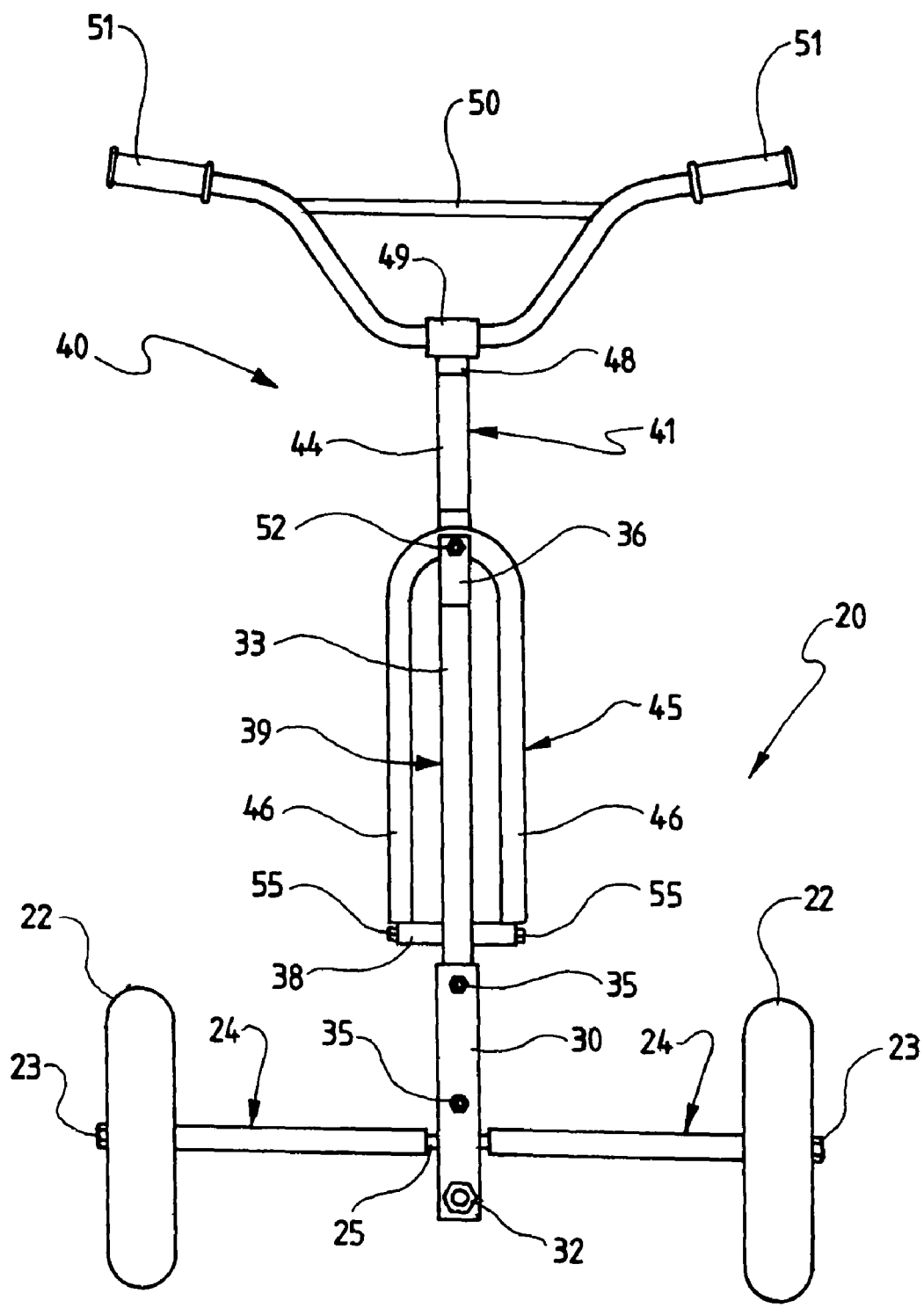
FIG. 1 is a front view of an attachment according to a first preferred embodiment of the present invention when the attachment is secured to a bicycle.
Figure 2:
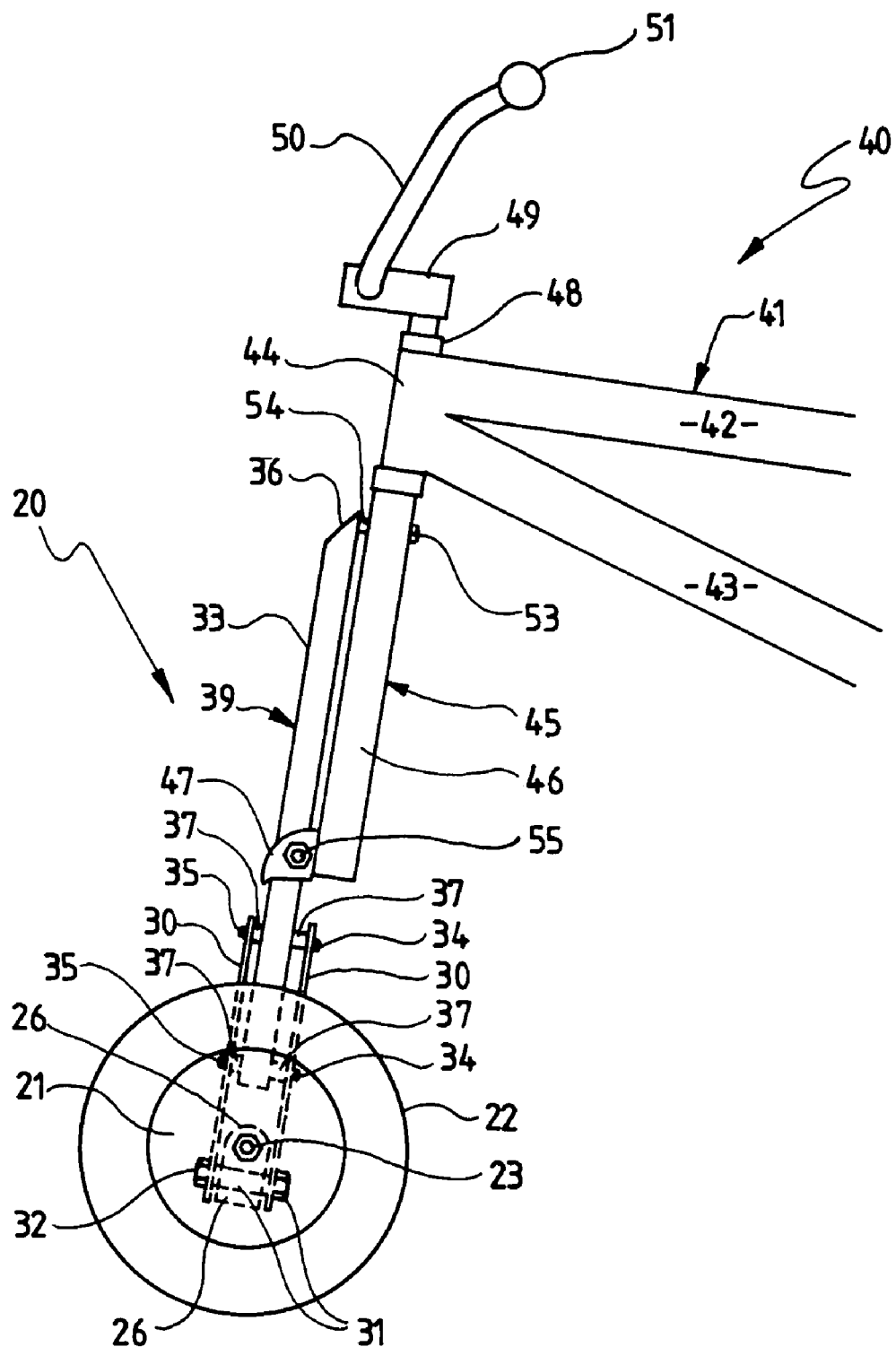

Referring to FIGS. 1 and 2, an attachment 20 according to a first preferred embodiment of the present invention comprises a pair of rotatable wheels 21 on which are mounted pneumatic tyres 22. Nuts 23 secure the wheels 21 to a connecting portion which is in the form of common axle 24 which extends between the wheels 21. A section 25 of the axle 24 which is located midway along its length has a reduced diameter, and extends through a bearing 26.

Rectangular plates 30 overlie opposite sides of the bearing 26, and a pivot pin or bolt 31 extends through the plates 30 and the bearing 26 at right angles to the axle 24. The pivot pin 31 is secured to the bearing 26 and the plates 30 by a nut 32, and is located below the axle 24. The bearing 26 is able to pivot relative to the pivot pin 31 and the plates 30. Bolts 34 and nuts 35 secure the plates 30 to a tube 33 which has a rectangular profile and a beveled end 36. In addition to extending through the plates 30 and the tube 33, the bolts 34 extend through washers 37 which are located between the plates 30 and the tube 33. A rod 38 extends through and is secured to the tube 33 such that the rod 38 extends at right angles with respect to the tube 33. The plates 30, tube 33, and rod 38 comprise a securing portion 39 of the attachment 20.

FIGS. 1 and 2 depict the attachment 20 when it is secured to a bicycle 40 which includes a frame 41 which has a top tube 42, a down tube 43 and a head tube 44. Both the top tube 42 and the down tube 43 extend from a head tube 44. The bicycle 40 also has a fork 45 which has a pair of arms 46, a respective slotted dropout 47 extending from each arm 46, and a fork steerer tube (not depicted) which extends upwardly from the arms 46. Each dropout 47 has a slot (not shown) for receiving the axle of a front wheel which is normally secured to the fork 45. The fork steerer tube extends through the head tube 44 and a headset 48 such that the fork 45 is able to swivel relative to the frame 41. A handlebar stem 49 is secured to the fork steerer tube so that the stem 49 is able to swivel with the fork 45 relative to the frame 41. A handlebar 50 is fixed to the stem 49, and hand grips 51 are secured to the handlebar 50.

If the bicycle 40 has a front wheel or a front brake caliper secured to the fork 45, the front wheel and the front brake caliper must firstly be removed from the fork 45 before the attachment 20 is able to be secured to the fork 45. The attachment 20 is secured to the fork 45 by firstly inserting each end portion of the rod 38 into the slot of a respective dropout 47. The tube 33 is pivoted about the rod 38 so that the tube 33 overlies the portion of the fork 45 where the arms 46 of the fork 45 are joined to each other. The tube 33 is then secured to the fork 45 by a nut 52 and a bolt 53. The opening in the fork 45 which the bolt 53 extends through may be conventionally used to secure a front brake caliper to the fork 45. In addition to extending through the fork 45 and the tube 33, the bolt 53 also extends through a washer 54 which is located between the tube 33 and the fork 45. Nuts 55 are used to secure the rod 38 to the dropouts 47. In particular, the nuts 55 are screwed onto threaded ends of the rod 38, and are tightened until the rod 38 is secured to the dropouts 47 . . .

The bicycle 40 which includes the attachment 20 is able to be ridden in the usual manner. When the bicycle 40 is leaned over during a turn in the usual manner, both tyres 22 of the attachment 20 remain in constant contact with the surface on which the bicycle 40 is being ridden. This is due to the axle 24 and wheels 21 of the attachment 20 being able to swivel with the fork 45 when the fork 45 is turned relative to the bicycle frame 41, and because the fork 45 is able to pivot relative to the axle 24.

Figure 3:
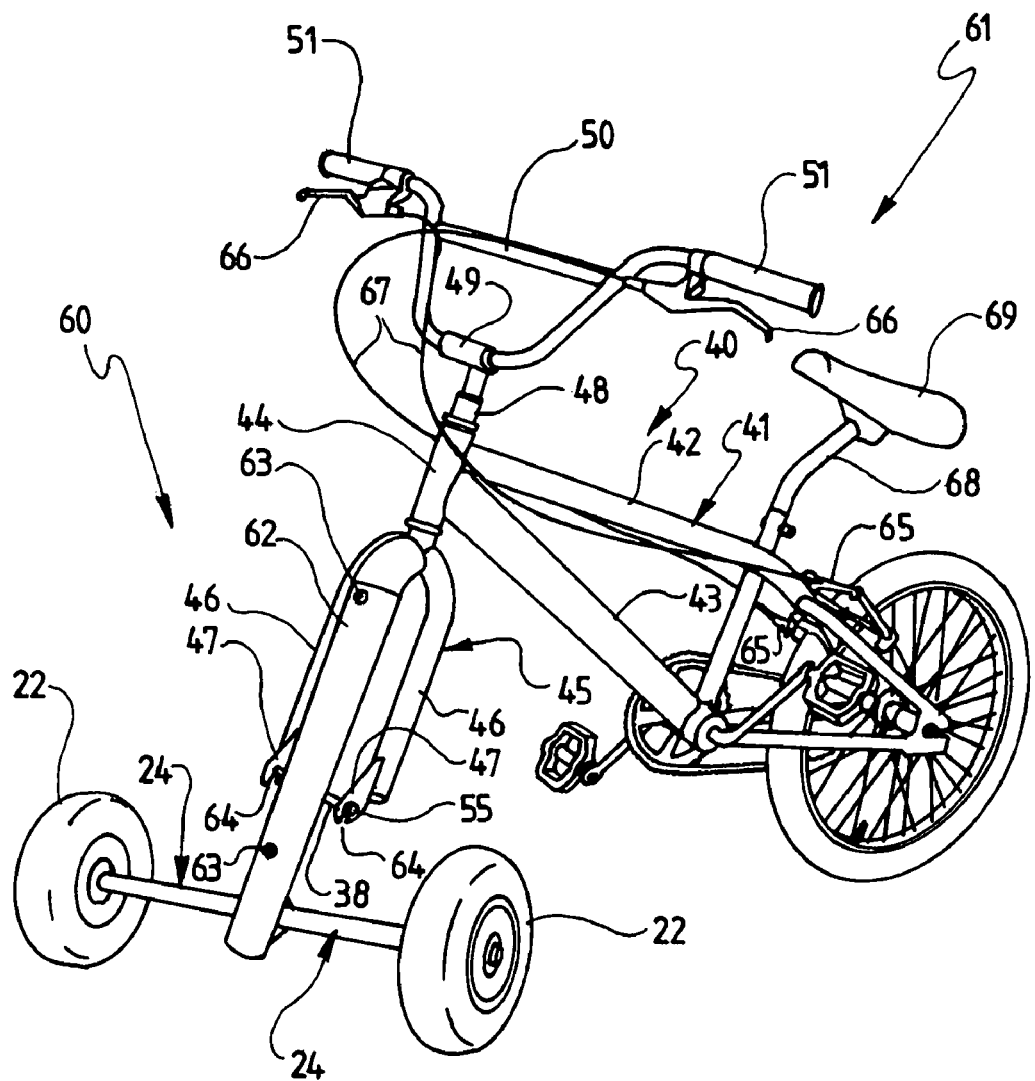
FIG. 3 depicts an attachment according to a second preferred embodiment of the present invention when the attachment is secured to a BMX bicycle.

FIG. 3 depicts an attachment 60 according to a second preferred embodiment of the present invention when it is secured to a BMX bicycle 61. For convenience, like features of the attachments 20, 60 have been referenced using the same reference numerals. The attachment 60 is substantially the same as the attachment 20 except that the attachment 60 also has a cover 62 which covers the front and side portions of the tube 33 and plates 30, and which is secured relative to the tube 33 and plates 30 by nuts and bolts 63.

Visible in FIG. 3 are slots 64 in the dropouts 47 of the bicycle's fork 45. It is those slots 64 which receive the rod 38 of the attachment 60.

The bicycle 61 has two rear brake calipers 65 secured relative to the frame 41. The brake calipers 65 are operated by brake levers 66 which are connected to the calipers 65 by brake cables 67. The idea of having two rear brake calipers 65 is to compensate for the lack of a front brake caliper on the bicycle 61. Other embodiments, may, for example, only have a single rear brake caliper, or may have a different type of brake which does not include a caliper. For example, the bicycle 61 may have a coaster brake rather than a caliper-type brake.

As can be seen in FIG. 3, the bicycle 61 also has a bent seat post 68 to which a seat 69 is secured. In other embodiments, the seat post 68 may, for example, be a straight seat post rather than a bent seat post.

The attachment 60 depicted in FIG. 3 has been swiveled or turned slightly to one side from a straight-ahead position as a consequence of swiveling the fork 45 relative to the frame 41 of the bike 61 in the same direction. Also, both the tube 33 (not depicted) of the attachment as well as the fork 45 are tilted relative to the axle 24 in the same direction that the fork 45 has been swiveled relative to the frame 41. Both tyres 22 are resting on a support surface even though the bike 61 is slightly tilted.

Figure 4:
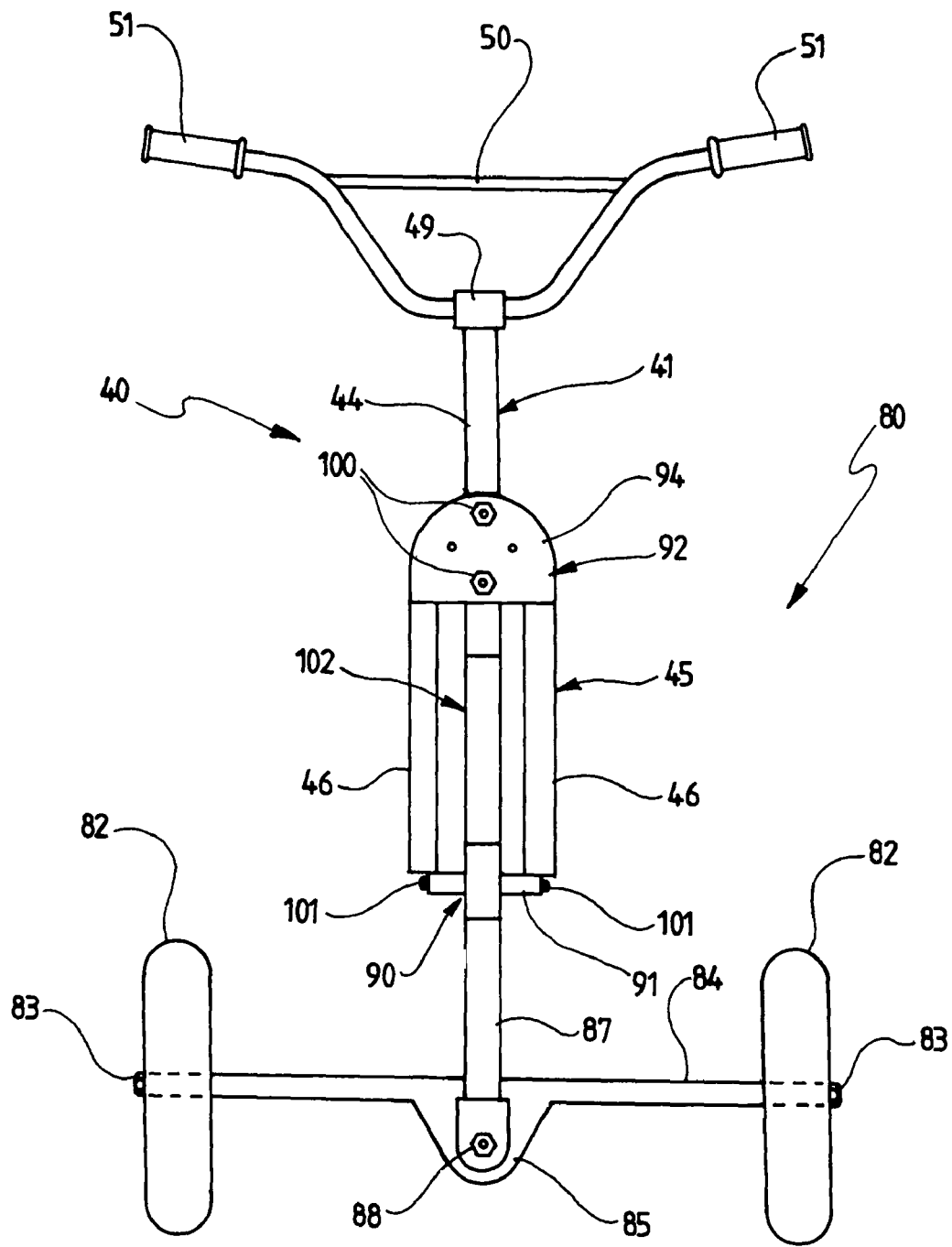
FIG. 4 is a front view of an attachment according to a third preferred embodiment of the present invention when the attachment is secured to a bicycle.
Figure 5:
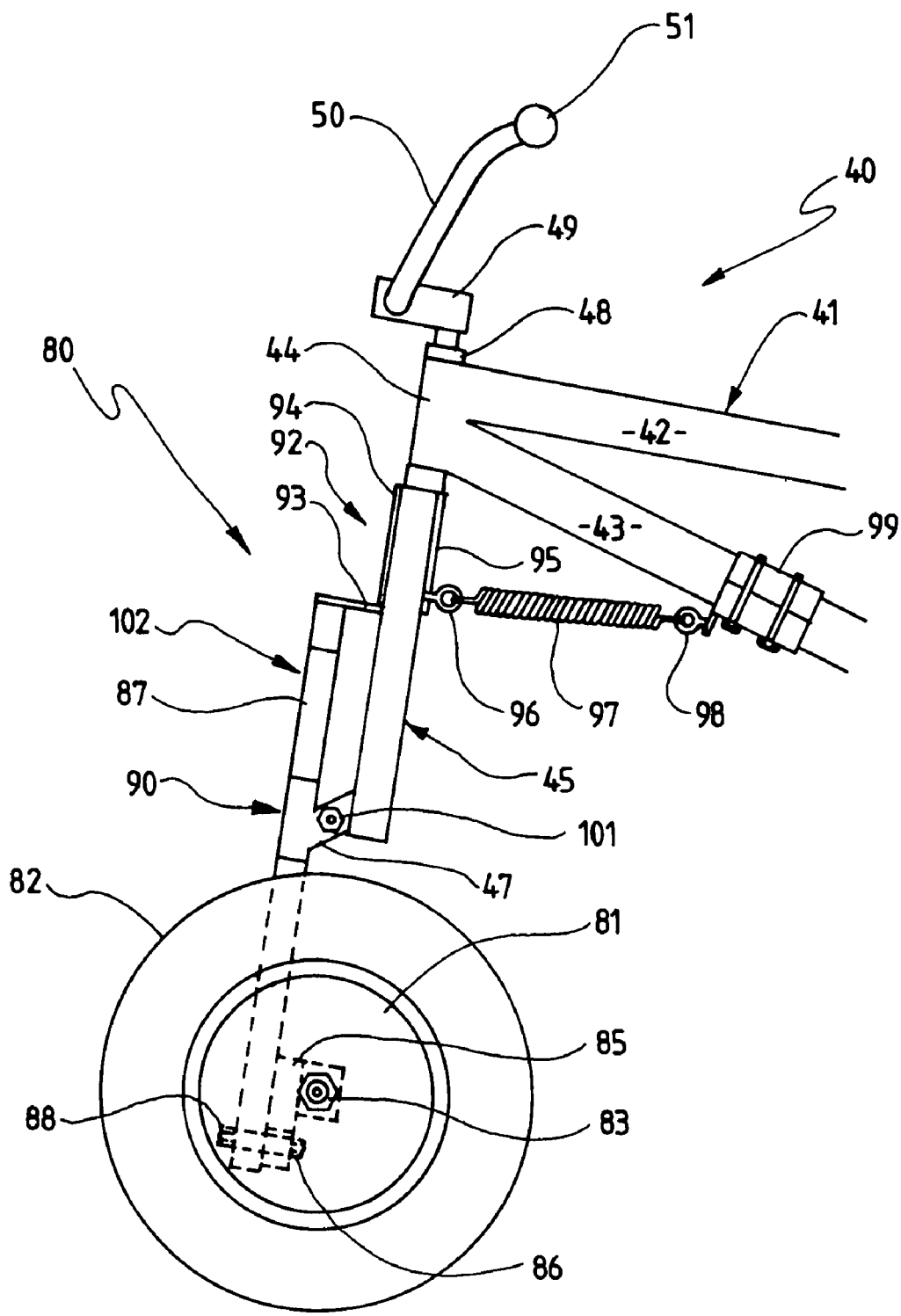

FIGS. 4 and 5 depict an attachment 80 according to a third preferred embodiment of the present invention. The attachment 80 comprises a pair of rotatable wheels 81 on which are mounted pneumatic tyres 82. Nuts 83 secure the wheels 81 to a connecting portion which is in the form of a common axle 84 which extends between the wheels 81. The axle 84 extends through a bearing 85. A pivot pin or bolt 86 extends through the bearing 85 and a lower end of a tube 87 at right angles to the axle 84 so that the tube 87 is thereby hinged to the axle 84 and is able to pivot from side to side. The pivot pin 86 is secured to the bearing 85 by a nut 88, and is located below the axle 84.

A bracket 90 is secured to the tube 87 at a location which is approximately midway along the tube 87. The bracket 90 includes a rod 91 which extends at right angles with respect to the tube 87.

A clamp 92 is secured to the top of the tube 87 and includes a projecting member 93 which extends perpendicularly from the tube 87, a front clamping plate 94 which extends perpendicularly from the member 93, and a rear clamping plate 95. An eyelet 96 is secured to the rear plate 95, and an end of a coil tension spring 97 is secured to the eyelet 96. The other end of the spring 97 is secured to another eyelet 98 which is secured to a clamp 99.

The tube 87, bracket 90, and clamp 92 of the attachment 80 comprise a securing portion 102 of the attachment 80.

FIGS. 4 and 5 depict the attachment 80 when it is secured to the bicycle 40 which is depicted in FIGS. 1 and 2 and which has been previously described in detail.

After removal of the front wheel (if present) and the front brake caliper (if present) of the bicycle 40, the attachment 80 is secured to the fork 45 by firstly inserting the end portions of the rod 91 into the slots of the dropouts 47. The tube 87 is pivoted about the rod 91 so that the front clamping plate 94 overlies the portion of the fork 45 where the arms 46 of the fork 45 are joined to each other. The rear clamping plate 95 is positioned on the other side of the fork 45 behind the front clamping plate 94, and both plates 94, 95 are secured to the fork 45 by nuts and bolts 100. The uppermost bolt which secures the plates 94, 95 together not only extends through the plates 94, 95, but also extends through the opening in the fork 45 which may conventionally be used to secure a front brake caliper to the fork 45. The rod 91 is secured to the dropouts 47 by nuts 101. The clamp 99 is secured to the down tube 43 of the bicycle 40 so that the spring 97 extends between the fork 45 and the frame 41, and is under tension.

The attachment 80 operates in the same manner as the attachment 20 when the attachment 80 is secured to the bicycle 40. However, the presence of the spring 97 provides a gradually increasing resistance to the rotation of the forks 45 relative to the frame 41. It has been found that this can provide a greater degree of riding stability.

Throughout the specification and the claims, unless the context requires otherwise, the term "comprise", or variations such as "comprises" or "comprising", will be understood to apply the inclusion of the stated integer or group of integers but not the exclusion of any other integer or group of integers.

Throughout the specification and claims, unless the context requires otherwise, the term "substantially" or "about" will be understood to not be limited to the value for the range qualified by the terms.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

It will be clearly understood that, if a prior art publication is referred to herein, that reference does not constitute an admission that the publication forms part of the common general knowledge in the art in Australia or in any other country.

The invention claimed is:

1. A bicycle attachment comprising a pair of spaced rotatable wheels for engaging with a support surface, a connecting portion extending between and secured to the wheels, and a securing portion hinged relative to the connecting portion such that the securing portion is able to pivot relative to the connecting portion, wherein the securing portion is adapted to be secured relative to a fork of a bicycle such that swiveling the fork relative to a frame of the bicycle also swivels the wheels and the connecting portion relative to the frame, and such that pivoting the securing portion relative to the connecting portion also pivots the fork relative to the connecting portion, and the connecting portion is secured to a bearing and the securing portion is secured to the bearing by a pivot, such that the securing portion is able to pivot relative to the bearing.

2. The bicycle attachment of claim 1, wherein the connecting portion is an axle.

3. The bicycle attachment of claim 1, wherein the pivot is located below the connecting portion.

4. The bicycle attachment of claim 1, wherein the securing portion includes a plurality of plates hinged to the connecting portion, and a tube is secured to the plates.

5. The bicycle attachment of claim 1, wherein the securing portion includes a tube which is hinged directly to the connecting portion.

6. The bicycle attachment of claim 1, wherein the securing portion includes a rod which is adapted to be secured to dropouts of the fork.

7. The bicycle attachment of claim 1, wherein the securing portion is adapted to be secured to a pair of arms of the fork.

8. The bicycle attachment of claim 1, wherein the securing portion includes a clamp for clamping the attachment to the fork.

9. The bicycle attachment of claim 8, wherein the clamp includes a pair of clamping plates for clamping on to the fork.

10. The bicycle attachment of claim 1, wherein the attachment further comprises a resistance mechanism for providing resistance to rotation of the fork relative to the frame of the bicycle.

11. The bicycle attachment of claim 10, wherein the resistance mechanism includes a clamp which is adapted to be secured to the frame of the bicycle, and a coil spring extending between the clamp and the securing portion of the attachment.

* * * * *